Dec. 29, 1925.  
E. G. BRANDT  
FOLDING COT  
Filed Jan. 4, 1923

WITNESSES

Inventor
EDWIN G. BRANDT
By
Attorney

Dec. 29, 1925.                    1,567,786
E. G. BRANDT
FOLDING COT
Filed Jan. 4, 1923          6 Sheets-Sheet 6

EDWIN G. BRANDT, Inventor

Patented Dec. 29, 1925.

1,567,786

UNITED STATES PATENT OFFICE.

EDWIN G. BRANDT, OF SPRINGFIELD, MISSOURI.

FOLDING COT.

Application filed January 4, 1923. Serial No. 610,667.

*To all whom it may concern:*

Be it known that I, EDWIN G. BRANDT, a citizen of the United States, residing at Springfield, in the county of Greene and State of Missouri, have invented certain new and useful Improvements in a Folding Cot, of which the following is a specification.

This invention relates to collapsible or folding articles of furniture, such as beds, cots, swinging couches and the like and the primary object of the present invention is to provide novel means for permitting the various parts of a device to be quickly folded or set up in operative position, said means being so constructed as to form a rigid and strong joint at the connection of the various parts of the device.

Another object of the invention is to provide a collapsible cot, for use on automobiles and camping trips, sleeping porches and the like which can be folded into a small compass, so as to occupy a minimum amount of space during transit or storage, and which is so constructed that the same will be rigid and strong when set up in position for use.

A further object of the invention is to provide a double collapsible cot embodying side rails and a mid rail for supporting a flexible cover, the side rails and mid rail being collapsible, and supporting collapsible legs, which are provided with inter-connecting bracing means for holding the legs in rigid position when the double cot is set up ready for use.

A further object of the invention is to provide novel means for connecting the legs with the side rails so as to permit the legs to be folded along side of and in parallel relation to the side rails.

A further object of the invention is to provide a novel joint for connecting the sections of the side and mid rails together, so that the said rails can be maintained in longitudinal alignment against movement when the cot is set up for use.

A further object of this invention is to provide novel means for connecting the brace members of the legs to the side rails, whereby the said brace members will form brace members for the said rails.

A further object of the invention is to provide a novel form of legs for the cot, whereby portions of the legs can be disposed at right angles to the other portions of the legs for forming supports, whereby the cot can be used to advantage on automobile trips, the said right angular portions of the legs forming means for engaging the upper edges of the body portion of the vehicle.

A further object of the invention is to provide a novel joint for connecting the sections of the legs together, whereby the sections of the legs can be either maintained in longitudinal alignment with one another or at right angles to one another.

A still further object of the invention is to provide a strong and durable folding cot of the above character, which will be simple and easy to manufacture, and one which can be placed upon the market at a reasonable cost.

With these and other objects in view the invention consists in the novel construction, arrangement and formation of parts, as will be hereinafter more fully described, claimed and illustrated in the accompanying drawings, forming a part of this specification, in which drawings:

Figure 16 is a detail section taken on the line 16—16 of Figure 15, and

Referring to the drawings in detail, wherein similar reference characters designate corresponding parts throughout the several views the letter A generally indicates the improved folding cot, which includes the longitudinally extending side rails 5 and 6 and the longitudinally extending mid rail 7. These rails 5, 6 and 7 each include a pair of sections 8 and 9, which are connected together, by novel form of joints 10, which will be hereinafter more fully described. These joints 10 are disposed in transverse alignment and are arranged at the transverse center of the cot, so as to permit the cot to be folded at a point equi-distant its ends to allow the sections 8 and 9 of the rails 5, 6 and 7 to be placed in abutting relation to one another when the cot is in its collapsed or folded condition.

Each joint 10 includes an elongated body substantially U-shaped in cross section and one end of this body is connected by means of rivets or the like 11 to the inner ends of one section 9 of the rail. The portion of the body which embraces the rail section 9 can be provided with flanges 12 for engaging the lower surface of the rail section. The other portion of the body projects outwardly of the rail section 9 for embracing the other rail section 8 and the body at a point substantially intermediate its ends is provided with pivot ears 12 which are adapted to align with the pivot ears 13 carried by a bracket 14 which is secured to the rail section 8. A pivot pin 15 is placed through these aligned pivot ears 12 and 13 which permit the hinging of the rail sections 8 and 9 together. The free end of the portion of the body of the joint 10 which embraces the rail section 8 is provided with depending ears 16 having notches 17 formed in their forward edges. These notches 17 are adapted to receive a resilient latch member 18 which is carried by the rail section 8. This latch member 18 can be formed of resilient wire or the like and includes side legs 19 which are secured to the rail section 8 in any preferred manner and a connecting bight portion 20 which is adapted to spring in the notches 17. It is obvious that when the sections 8 and 9 are in longitudinal alignment that the resilient latch member 17 will seat in the notches 17 and thus prevent movement of the sections 8 and 9 in relation to each other. It can be seen that by providing this type of joint 10 that an exceptional rigid structure is provided, which will effectively brace the sections 8 and 9 and prevent collapsing thereof.

Figure 1:
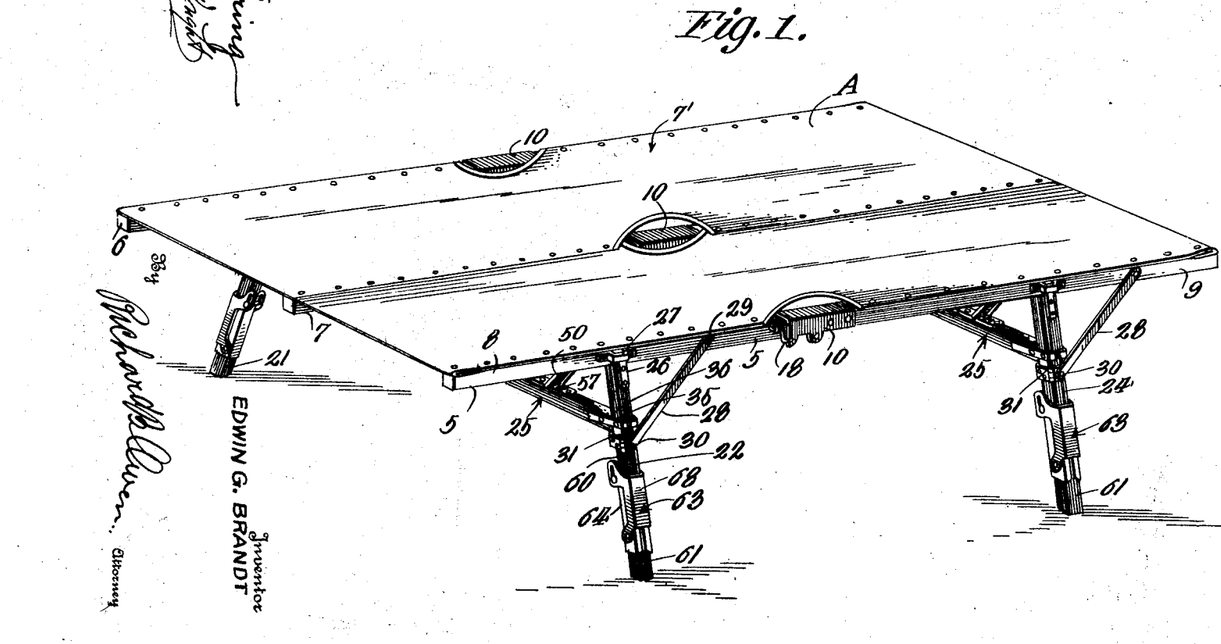
Figure 1 is a perspective view of the improved collapsible cot.
Figure 2:
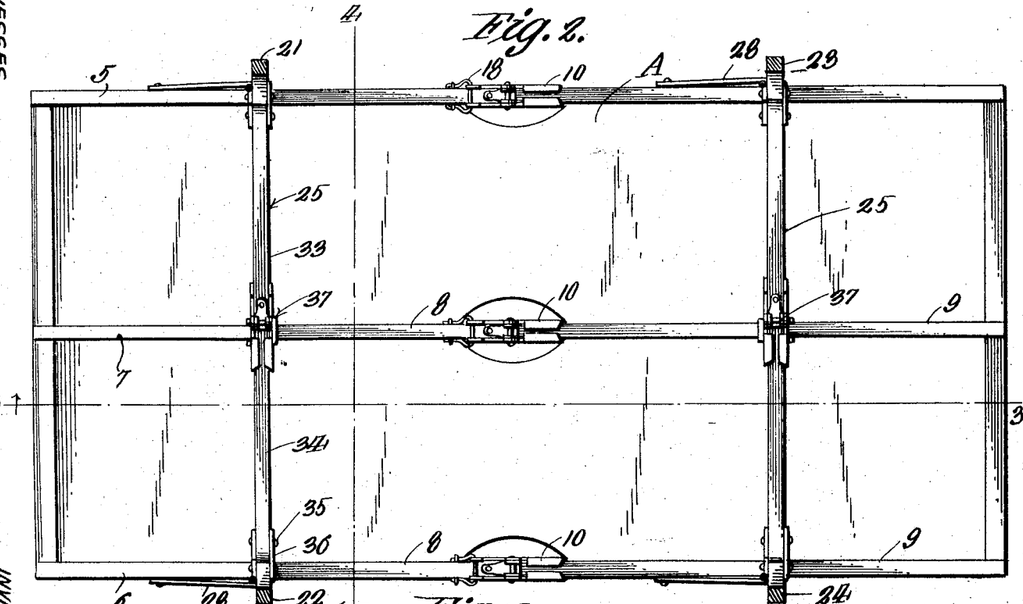
Figure 2 is a bottom plan view of the cot showing the legs in section.

The side rails 5 and 6 have connected thereto, by means, which will be hereinafter more fully described, supporting legs 21, 22, 23, and 24 and these legs are located at a point substantially intermediate the ends of the sections 8 and 9 of the said side rails. These legs 21, 22, 23 and 24 are preferably arranged so as to diverge outwardly from the rails 5 and 6 and thereby form an enlarged base for the cot. These legs are preferably arranged in pairs, that is the legs 21 and 22 are disposed at one end of the cot while the legs 23 and 24 are disposed adjacent to the other end of the cot and the pairs of legs are connected together by novel form of brace members 25. Each leg is connected to its rail in the following manner. A section of strap iron 26 is secured to the upper end of each leg so as to project outwardly therefrom and is adapted to fit in a suitable loop 27 secured to the rail with which the leg is associated. The upper end of each leg is adapted to rest under the rail, so that a direct thrust can be imparted to the legs from the rail. A piece of strap iron 28 is secured respectively by means of pivot pins 29 and 30 to the rail and to the legs and as clearly shown in Figure 1 of the drawing this strap iron or brace 28 is adapted to extend at an angle to the leg and the rail. The leg is adapted to swing on this brace or strap iron and it is obvious that when the member 26 is pulled outwardly from the loop that the leg can be swung in relation to the strap iron 28 into parallel relation to its rail. The portion of the brace or strap iron 28 which is connected with the leg is secured by means of pivot pin 30 with a swinging hinge leaf 31, so that it can be turned outward to lie along side of the outer face of its rail. As stated, the legs of each pair are connected by brace members 25. Each of these brace members 25 include a pair of independent sections 33 and 34 which are hingedly connected at their outer ends by means of pivot pins 35 to strap irons 36 carried by the legs. Thus it can be seen that when the sections 34 and 33 are not connected together, that the same can be swung in parallel relation to the legs with which they are associated and thus the legs with their braces can be swung along the outer face of the side rails.

The sections 33 and 34 of the brace members 25 are connected together by novel forms of connecting member 37. This connecting member 37 is constructed similar to the joint 10, with the exception that the sections 33 and 34 can be disconnected from each other. As clearly shown in Figure 14 the connecting means 37 include an elongated body 38 of substantially U-shape in cross section and one end of this body embraces the inner end of one section, which as shown in the section 34 and is secured thereto by suitable rivets or the like 39. The other end of the body 38 is adapted to receive the inner end of the section 33 and the body 38 at a point intermediate its ends is provided with a suitable pair of depending apertured ears 40 for the reception of a pivot pin 41. The section 33 carries a piece of strap iron 42 having formed thereon an open hinge barrel 43 which is adapted to engage about the hinge pin 41. This permits the inter-connection of the sections 33 and 34 of each brace member 25. As shown the outer end of the body 38 is provided with ears 44 which are secured for the reception of a removable pin 45 whereby the sections 33 and 34 of each brace member are positively maintained in their set-up position.

Figures 3, 5, 6:
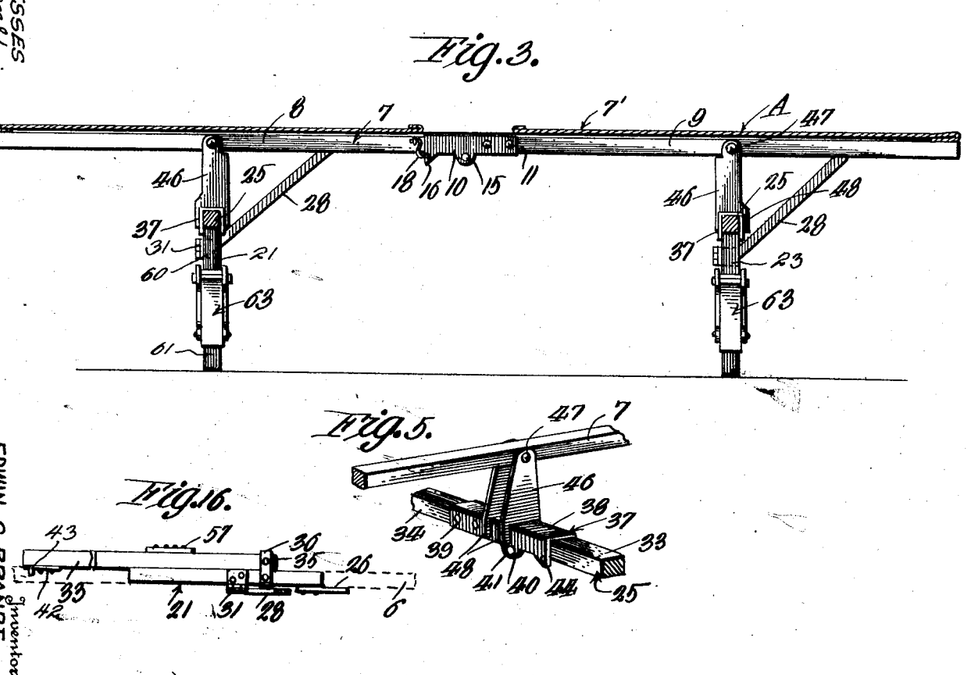
Figure 3 is a longitudinal section through the improved cot taken on the line 3—3 of Figure 2.
Figure 5 is a detail fragmentary perspective view illustrating the means of connecting the mid rail with the brace members.
Figure 6 is a detail horizontal section taken on the line 6—6 of Figure 4.

In order to form a strong and durable structure, the mid rail 7 on each side of the transverse center thereof carries a hinged brace member 46. This hinged brace member 46 is also of U-shaped construction in cross section so as to permit the same to embrace the mid rail 7 when the cot is in its collapsed or folded position. As shown the brace member 46 is connected to the mid rail 7 by means of a hinge pin 47. The outer or free end of the brace member 46 is provided with suitable depending ears 48 for engaging the body portion 38 of the connection 37. By this construction it can be seen that an exceptionally rigid and durable structure has been provided.

In order to further brace the structure the side rails 5 and 6 have pivotally connected thereto inwardly extending brace members 50. These brace members 50 are of a novel construction and form the dual function of bracing the side rails and the transverse braces 25 and for forming latches for engaging the legs 21, and 22, 23, and 24, when the legs are in their set-up position. As shown the upper ends of these brace members 50 are connected by means of hinge pins 51 with swinging latch members 52 which are rotatably mounted on suitable pins 53 carried by the side rails.

Figures 4, 6, 14, 17:
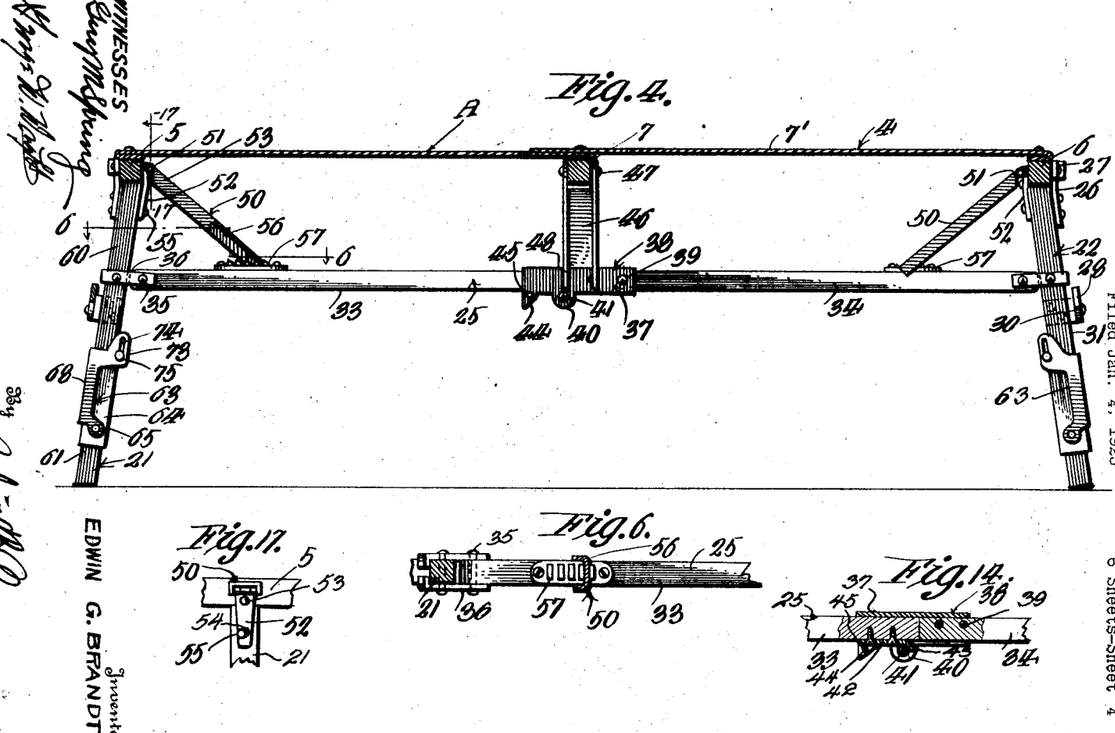
Figure 4 is a transverse section through the improved cot taken on the line 4—4 of Figure 2.
Figure 14 is a fragmentary vertical longitudinal section through one of the transverse braces for connecting the legs, showing the means for detachably connecting sections of the brace together.
Figure 17 is a detail section taken on the line 17—17 of Figure 4 illustrating the novel means for locking the leg in its operative position.
Figure 7:
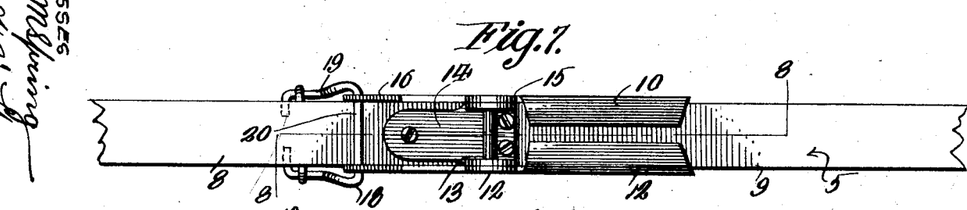
Figure 7 is a bottom plan view of one of the rails showing the novel means for connecting the sections thereof together.
Figures 8, 9, 10:
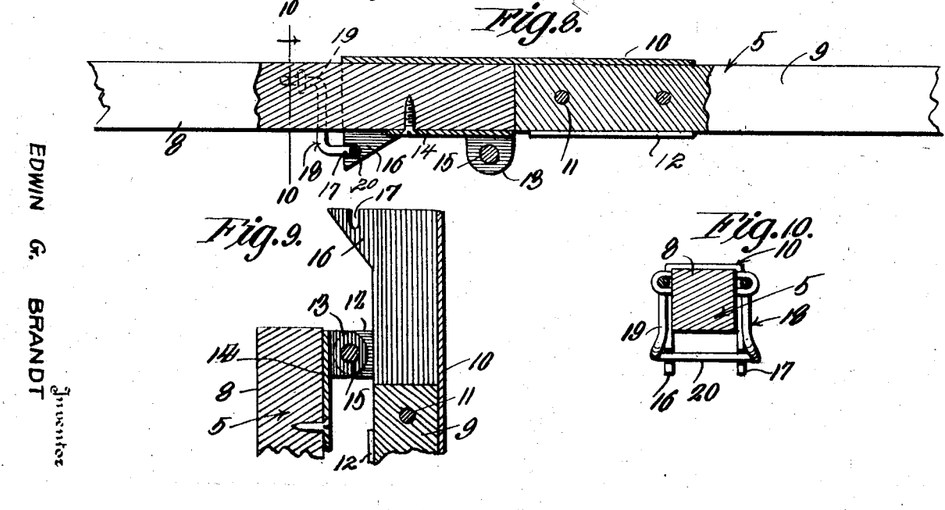
Figure 8 is a fragmentary longitudinal section through a rail taken on the line 8—8 of Figure 7.
Figure 9 is a fragmentary sectional view illustrating the position of the sections of a rail when the same are in their collapsed position.
Figure 10 is a detail transverse section through one of the rail members taken on the line 10—10 of Figure 8.

Each latch member 52 is provided with an inclined slot 54 opening out one side face thereof and when a brace is in the position shown in Figure 4 of the drawings the latch member 53 is adapted to be moved into engagement with the inner face of an adjacent leg and the inclined slot 54 receives a locking pin 55 carried by the upper end of the adjacent leg. Thus it can be seen that a strong connection is provided for each leg and movement of the legs is positively prevented when the brace members are swung to the position shown in Figure 4 of the drawings. When the brace member is swung to an inoperative position the same is disposed in parallel relation to its side rail, which will also swing the latch member 52 to the same position. In order to add strength to the latch member the longitudinal sides thereof are provided with reinforcing flanges 56 which are adapted to embrace the sides of the rails when the braces are swung to their inoperative positions. Each section of the transverse brace members 25 is provided with a rack bar 57 and the lower ends of the brace members 50 are adapted to engage the rack members.

In order that the cot may be successfully used for automobile touring, the legs can be made in sections so as to permit the lower ends of the legs to be swung at right angles to the main or body portion thereof to form supports. And it is obvious that the right angular extending sections of the legs can be laid on the upper edge of the body of the vehicle and thus persons can sleep with comfort inside of the automobile.

Figure 11:
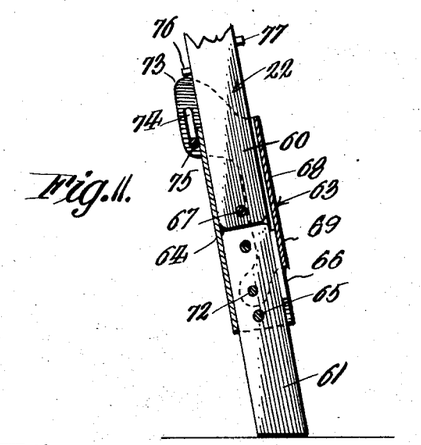
Figure 11 is a detail fragmentary side elevation of one of the leg members illustrating the novel joint for the sections thereof, the joint being shown in section.
Figure 12:
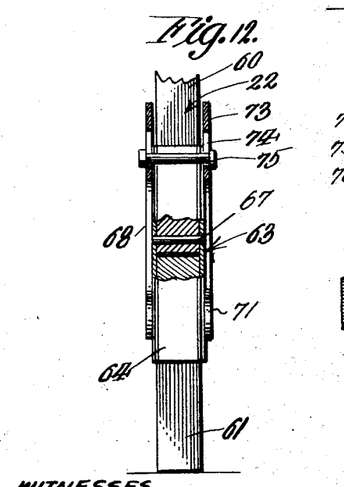
Figure 12 is a detail fragmentary rear elevation of one leg showing parts of the joint carried thereby in section.
Figure 13:
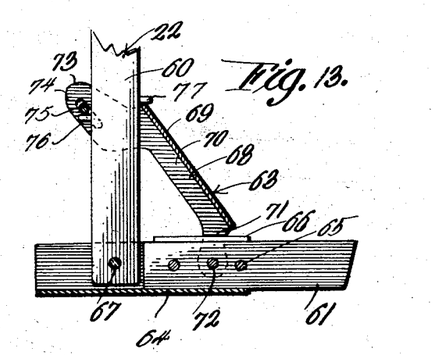
Figure 13 is a fragmentary detail side elevation of a leg showing the position of the sections thereof when the cot is to be set on a support, such as on the top of an automobile body.
Figure 15:
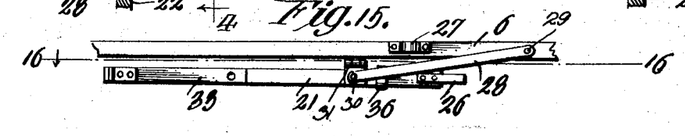
Figure 15 is a fragmentary side elevation of the cot showing the collapsed position of one of the legs in relation to one side rail.

As clearly shown in Figures 11, 12 and 13 each leg includes an upper or body section 60 and a lower section 61. These sections 60 and 61 are connected together by a novel form of joint 63, which forms a vital part of this invention.

The joint 63 includes an elongated body portion 64 substantially U-shaped in cross section, one end of which is adapted to embrace the inner end of the lower section 61. This portion of the body is adapted to be secured to the section 61 by suitable rivets or the like 65 and if so desired the portion of the body 64 embracing the section 61 can be provided with inwardly directed flanges 66. The other portion of the body is adapted to embrace the lower end of the main or body section 60 and is pivotally secured thereto by means of a pivot pin 67. A combined brace and support 68 is provided for the joint and the brace and support include a body 69 having reinforcing side flanges 70. The lower end of the body 68 is provided with depending hinged ears 71 which are connected to brace section 61 by means of a pivot pin or the like 72 which extends through the body 64. The upper end of the body 68 is provided with relatively large inwardly extending parallel disposed ears 73 for embracing the upper leg sections 60 and as shown these ears 72 are provided with slots 74 which slidably support a locking and bracing pin 75. The leg section 50 on opposite sides is provided with stop pins 76 and 77. As clearly shown the stop pin 77 is located above the stop pin 76.

When the sections 60 and 61 are in longitudinal alignment the bodies 64 and 68 lie in abutting relation with the opposite faces of the sections 60 and 61 and the pin 75 is adapted to be pushed down in the slot 74 into engagement with the upper end of the body portion 64 which precludes movement between the sections 50 and 61.

When the leg section 61 is to be swung at right angles to the section 60 to form a support the pin 75 is moved upwardly in the slot 74 away from the body 64 which permits the leg section 61 to swing on the pivot pin 72 at substantial right angles to the leg section 60. The upper end of the body 68 is adapted to engage the stop pin 77 while the pin 75 can be moved in the upper end of the slot into engagement with the upper surface of the stop pin 76. This holds the leg sections at right angles to each other and the body 68 forms a durable brace for the leg sections.

From the foregoing description it can be seen that I have provided a simple and durable folding cot, which can be readily and quickly collapsed so as to occupy a minimum amount of space and which will be exceptionally strong and rigid in use.

Changes in the details may be made without departing from the spirit or scope of this invention.

What I claim as new is:—

1. A collapsible cot comprising side rails, a mid rail, pairs of legs connected to the side rails for swinging movement, a transverse brace rail for each pair of legs, each transverse brace rail including a pair of sections, means hingedly connecting the outer ends of the sections of the transverse brace rails to the legs, a joint for detachably connecting the meeting ends of the sections of the transverse brace rails together, and a hinged brace carried by the mid rail for detachably engaging each transverse brace rail.

2. A collapsible cot comprising side rails, a mid rail, pairs of legs connected to the side rails for swinging movement, a transverse brace rail for each pair of legs, each transverse brace rail including a pair of sections, means hingedly connecting the outer ends of the sections to the legs, a joint for detachably connecting the inner ends of the sections together, a brace member carried by each mid rail for engaging the joint including an elongated body substantially U-shaped in cross section pivotally secured at its upper end to the mid rail, the body being adapted to embrace the mid rail when in its collapsed position, and lugs formed on the lower end of the brace for engaging on opposite sides of the joint, when the brace is swung to its operative position.

3. In a folding cot, a brace rail for the legs of the cot including independent sections, and a joint for detachably connecting the inner ends of the sections together including an elongated body substantially U-shaped in cross section for embracing one end of one section and for extending over the adjacent end of the other section, means connecting the body to the first mentioned section, ears carried by the body at a point intermediate its ends, a pivot pin carried by said ears, an open hinge barrel carried by the other section for detachably engaging the pivot pin, and a locking pin detachably carried by an end of the body for engaging under the last mentioned section.

4. In a folding cot, a pair of side rails, pairs of legs connected to the side rails for swinging movement, transverse brace rails for connecting the pairs of legs together, a swinging latch member carried by each side rail for engaging each leg, and a pivoted inclined brace secured to each latch member, a rack bar carried by the opposite ends of each transverse brace rail for receiving the lower end of the brace members, the brace members forming means for manipulating the latches.

5. In a folding cot, a side rail, a leg for the rail, a loop connected to the outer face of the side rail, a lug carried by the upper end of the leg for engaging in said loop, a leaf hingedly secured on a vertical pivot to the leg at a point intermediate its ends, and a brace bar secured to the rail and to the leaf.

6. In a folding cot, a pair of side rails, pairs of legs on the opposite ends of the side rails, transverse brace rails for connecting each pair of legs together, each brace rail including independent sections, means hingedly connecting the outer ends of the sections to the legs, means for detachably connecting the inner ends of the sections together, the sections of the brace rails being adapted to be swung in parallel relation to the legs, means detachably connecting the upper ends of the legs to the rails, a leaf pivotally connected to each leg by a pivot extending longitudinally of the leg, and an inclined brace bar hingedly connected to the rail and to the hinged leaf.

7. A device for connecting a pair of sections of an article of furniture together including an elongated body substantially U-shaped in cross section for receiving the inner end of one section, means rigidly connecting the body to the mentioned section, means for pivotally connecting the other section to the body, outwardly extending ears carried by the body adapted to extend beyond the last mentioned section, and a resilient locking member carried by the last mentioned member for engaging said ears to prevent swinging movement of the sections relative to one another.

8. In a bed including a body and legs carried by the body, each leg including a stationary section and a hinged section, and means for holding the hinged section in parallel relation to the stationary section or at right angles thereto and laterally of the sides of the body of the bed for engaging the sides of an automobile, whereby the bed can be readily associated with the automobile for sleeping purposes.

9. The combination with a pair of members, of a joint for connecting the members together including a U-shaped body rigidly secured to the inner end of one section and adapted to embrace the inner end of the other section, means pivotally connecting the inner end of the last mentioned section to the body, a swinging brace member hingedly connected to the first mentioned section, ears formed on the brace for embracing the other section, stop pins carried by the last mentioned section, and a lock pin adapted to engage one of said stop pins when the sections are disposed at right angles in relation to each other and to engage the outer end of the body when the sections are in parallel relation to each other.

In testimony whereof I affix my signature.

EDWIN G. BRANDT.